US009261052B2

(12) United States Patent
Saitoh et al.

(10) Patent No.: US 9,261,052 B2
(45) Date of Patent: Feb. 16, 2016

(54) FAILURE DIAGNOSIS APPARATUS OF EGR SYSTEM

(75) Inventors: Hirotaka Saitoh, Susono (JP);
Yoshitaka Nakamura, Nagoya (JP);
Toru Kidokoro, Hadano (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 743 days.

(21) Appl. No.: 13/583,182

(22) PCT Filed: Dec. 1, 2011

(86) PCT No.: PCT/JP2011/077780
§ 371 (c)(1),
(2), (4) Date: Sep. 6, 2012

(87) PCT Pub. No.: WO2013/080353
PCT Pub. Date: Jun. 6, 2013

(65) Prior Publication Data
US 2013/0139795 A1    Jun. 6, 2013

(51) Int. Cl.
| F02M 25/07 | (2006.01) |
| F02B 29/04 | (2006.01) |
| F02D 41/00 | (2006.01) |
| F02D 41/0065 | (2013.01); |
| F02M 25/0707 | (2013.01); |
| F02M 25/0709 | (2013.01); |
| F02M 25/0718 | (2013.01); |
| Y02T 10/121 | (2013.01) |

(52) U.S. Cl.
CPC ........ F02M 25/0702 (2013.01); F01P 2025/06 (2013.01); F02B 29/04 (2013.01);
(Continued)

(58) Field of Classification Search
CPC .............. F02M 25/07; F02M 25/0701; F02M 25/0702; F02M 25/0715; F02M 25/0728;
F02M 25/0753; F02M 25/0754; F02M 2700/31; F02M 2700/126; F01P 2025/04;
F01P 2025/06; F28F 27/02; F02D 41/0055
See application file for complete search history.

(56) References Cited

U.S. PATENT DOCUMENTS 5,137,004 A * 8/1992 Takahata et al. ........... 73/114.74
(Continued)

FOREIGN PATENT DOCUMENTS

| JP | 7-63122 A | 3/1995 |
| JP | 2001-207916 A | 8/2001 |

(Continued)

OTHER PUBLICATIONS

International Search Report for PCT/JP2011/077780 dated Mar. 13, 2012.

*Primary Examiner* — Erick Solis
*Assistant Examiner* — Anthony L Bacon
(74) *Attorney, Agent, or Firm* — Sughrue Mion, PLLC

(57) ABSTRACT

In the engine including an MPL-EGR system having an HPL-EGR mechanism 6 and an LPL-EGR mechanism 7, a pressure difference between upstream side pressure and downstream side pressure of a low pressure EGR cooler 73 provided in the LPL-EGR mechanism 7 is detected by a pressure difference sensor 89. When an actual pressure difference value detected is higher than a reference pressure difference value in a state where no blocking occurs in the LPL-EGR mechanism 7, and the deviation amount therebetween reaches a predetermined amount, it is determined that the blocking occurs in the inside of the low pressure EGR cooler 73. In contrast, when the actual pressure difference value detected is lower than the reference pressure difference value, and the deviation amount therebetween reaches a predetermined amount, it is determined that the blocking occurs in the inside of the pipe members 74 and 75 except the low pressure EGR cooler 73.

6 Claims, 6 Drawing Sheets

(56) References Cited

U.S. PATENT DOCUMENTS

| | | | | |
|---|---|---|---|---|
| 6,164,270 | A | * | 12/2000 | Bidner et al. ............ 123/568.16 |
| 2008/0141671 | A1 | * | 6/2008 | Takemoto .................... 60/605.2 |
| 2009/0133385 | A1 | * | 5/2009 | Ono ................................ 60/277 |
| 2013/0014734 | A1 | * | 1/2013 | Barbero ............. F02M 25/0728 123/568.16 |

FOREIGN PATENT DOCUMENTS

| | | |
|---|---|---|
| JP | 2001-289125 A | 10/2001 |
| JP | 2008-064046 A | 3/2008 |
| JP | 2010-190176 A | 9/2010 |
| JP | 2010-216449 A | 9/2010 |
| JP | 2011-89470 A | 5/2011 |

* cited by examiner

FAILURE DIAGNOSIS APPARATUS OF EGR SYSTEM

CROSS REFERENCE TO RELATED APPLICATIONS

This application is a National Stage of International Application No. PCT/JP2011/077780 filed Dec. 1, 2011, the contents of which are incorporated herein by reference in their entirety.

TECHNICAL FIELD

The present invention relates to a failure diagnosis apparatus of an EGR system, for example, mounted in an internal combustion engine of an automobile. In particular, the present invention relates to an improvement to identify a portion to be blocked in the EGR system. It is noted that, in the present specification, any one of a state where a flow path area of an EGR path is reduced (partial blocking state) and a state where the EGR path is fully blocked (full blocking state) is referred to as "blocking".

BACKGROUND ART

Conventionally, with regard to engines to carry out lean combustion, such as a diesel engine, it is concerned that a relatively large amount of nitrogen oxides (hereinafter referred to as NOx) is discharged. As its measures, it has been known to provide an exhaust gas recirculation system (EGR: Exhaust Gas Recirculation) to recirculate part of exhaust gas into an intake path (for example, see patent document 1).

The EGR system includes an EGR path that communicates an exhaust path and an intake path of an engine with one another, and an EGR valve provided in the EGR path. Then, an opening degree of the EGR valve is adjusted so as to regulate the amount of exhaust gas (the amount of EGR gas) recirculated from the exhaust path to the intake path via the EGR path, and an EGR ratio during intake air is set to a target EGR ratio set in advance. Thus, part of the exhaust gas is recirculated to the intake path, which allows a combustion temperature in the combustion chamber to drop and restrains the generation of NOx so as to improve the exhaust emission.

Also, in general, in the EGR system of this sort, an EGR cooler is provided in the EGR path. For example, in a system including only one (one system) EGR mechanism, which is disclosed by the patent document 1, the EGR cooler is applied to the EGR path of the EGR mechanism.

Also, as is disclosed in patent document 2, in a system (hereinafter referred to as "MPL-EGR system") including a high pressure EGR mechanism (hereinafter referred to as "HPL-EGR mechanism") and a low pressure EGR mechanism (hereinafter referred to as "LPL-EGR mechanism"), the EGR cooler is applied to only the EGR path of the LPL-EGR mechanism.

The HPL (High Pressure Loop)-EGR mechanism is such that the exhaust gas is recirculated from the exhaust path on the upstream side with respect to a turbine of a turbocharger (for example, exhaust manifold) to the intake path on the downstream side with respect to a compressor of the turbocharger.

Also, LPL (Low Pressure Loop)-EGR mechanism is such that the exhaust gas is recirculated from the exhaust path on the downstream side with respect to the turbine of the turbocharger to the intake path on the upstream side with respect to the compressor of the turbocharger. Accordingly, in the LPL-EGR mechanism, the exhaust gas can be recirculated to the intake air prior to supercharging by the compressor (intake air area under relatively low pressure), so that the recirculation amount can drastically be increased, and remarkable effects can be achieved in terms of the improvement of the exhaust emission.

Also, as a form of use of the MPL (Middle Pressure Loop)-EGR system, as disclosed in patent document 3, in a low load operating area of an engine, the exhaust gas having a relatively high temperature is recirculated using the HPL-EGR mechanism only so as to achieve the stability of combustion and restrain the emission of HC or CO. Also, in a high load operating area of the engine, the exhaust gas having a relatively low temperature is recirculated using the LPL-EGR mechanism only so as to restrain the generation of smoke accompanied with a high temperature of the intake air. Also, in a moderate load operating area of the engine, the exhaust gas is recirculated using both the HPL-EGR mechanism and the LPL-EGR mechanism so as to restrain the generation of HC, CO, and smoke.

Accordingly, the EGR cooler is not applied to the HPL-EGR mechanism that is aimed at recirculating the exhaust gas having a relatively high temperature, but the EGR cooler is applied to only the LPL-EGR mechanism that is aimed at recirculating the exhaust gas having a relatively low temperature.

RELATED ART DOCUMENTS

Patent Documents

Patent Document 1: Japanese Unexamined Patent Application Publication No. 2001-207916.
Patent Document 2: Japanese Unexamined Patent Application Publication No. 2010-190176.
Patent Document 3: Japanese Unexamined Patent Application Publication No. 2011-89470.

SUMMARY OF THE INVENTION

Problems to be Solved by the Invention

Incidentally, in recent years, with tighter regulations of automobile exhaust emissions (Euro 6 and the like), it has been demanded to detect blocking in the EGR system (blocking in the EGR path) with high accuracy (for example, capable of detecting a state where the blocking occurs to the extent of 80% prior to leading to the full blocking) and prevent the deterioration of exhaust emission beforehand that is associated with the high degree of blocking (for example, the full blocking occurs). In particular, the EGR cooler suppresses the high temperature of intake air by cooling the EGR gas, and greatly contributes to the reduction of the amount of NOx generated by reducing the combustion temperature. When the blocking occurs in the inside of the EGR cooler, the deterioration of the exhaust emission is remarkably conspicuous. In particular, the detection with the high accuracy with regard to the presence of the blocking in the inside of the EGR cooler has been demanded.

Also, when the blocking occurs in the EGR system (for example, as is disclosed by the patent document 1, when the correction amount of the opening degree of the EGR valve or the correction amount of the intake throttle valve exceeds a threshold value in a case where the amount of EGR gas is adjusted to a target EGR gas amount according to feedback control, it is determined that the EGR path is blocked), and when the blocking is detected, and the components are exchanged as needed, unless its blocking portion is identified, all the components such as the pipe constituting the EGR system and the EGR cooler are forced to be exchanged. That is, components in which no blocking occurs are also forced to be exchanged.

Accordingly, as to the EGR path in which the EGR cooler is applied, it has been demanded to determine the blocking in the inside of the EGR cooler with high accuracy, and distinguish the blocking in the inside of the EGR cooler from the blocking in the inside of the pipe member connected to the EGR cooler with high accuracy, and reduce the number of the exchange components to as few as possible.

The present invention has been achieved in view of the above circumstances to solve the technical problems, and it is an object of the present invention to provide a failure diagnosis apparatus of an EGR system that can identify a blocking portion in an EGR mechanism in which an EGR cooler is applied.

Means of Solving the Problems

—Principle of Solution to the Invention—

The principle of solution of the present invention to achieve the above object is such that in the EGR mechanism in which the EGR cooler is applied, a pressure difference between an upstream side and a downstream side of the EGR cooler is recognized, and a blocking position is identified by comparison of the pressure difference with a reference value (for example, a value regarding a state where the EGR mechanism is not blocked). That is, when the pressure difference is large, a pressure loss between the upstream side and the downstream side of the EGR cooler is increased, so that it is determined that the blocking occurs in the inside of the EGR cooler. When the pressure difference is small, a pressure loss on the upstream side or the downstream side with respect to the pressure acquisition position is increased, so that it is determined that the blocking occurs in the inside of the pipe member except the EGR cooler.

—Solution Means—

Specifically, the present invention presupposes that a failure diagnosis apparatus of an EGR system may be configured to include a pipe member and an EGR cooler linked to the pipe member and configured to recirculate part of exhaust gas discharged into an exhaust system of an internal combustion engine to an intake system via the pipe member and the EGR cooler. The failure diagnosis apparatus of the EGR system may be such that a pressure difference between upstream side pressure and downstream side pressure of the EGR cooler is detected, and whereas, when the pressure difference value detected is higher than a reference pressure difference value set in advance, and the pressure difference value is higher than a predetermined cooler blocking determination value, it is determined that blocking occurs in an inside of the EGR cooler, when the pressure difference value detected is lower than the reference pressure difference value, and the pressure difference value is lower than a predetermined pipe blocking determination value, it is determined that the blocking occurs in an inside of the pipe member.

Based on this specific matter, when the blocking occurs in the pipe member or the EGR cooler, the pressure difference between the upstream side pressure and the downstream side pressure of the EGR cooler is deviated from the reference pressure difference value as the degree of the blocking increases. In this case, when a deviation direction is on the positive side (a side on which the pressure difference value to be detected is increased), it can be determined that the deviation increases due to an increase of the pressure loss in the inside of the EGR cooler. When the deviation amount is equal to or more than a predetermined amount, and the pressure difference value to be detected is higher than a predetermined cooler blocking determination value, it is determined that the blocking occurs in the inside of the EGR cooler.

In contrast, when the deviation direction is on the negative side (a side on which the pressure difference value to be detected is decreased), it can be determined that the deviation increases due to an increase of the pressure loss in the inside of the pipe member on the upstream side or the downstream side with respect to the EGR cooler. When the deviation amount is equal to or more than a predetermined amount, and the pressure difference value to be detected is lower than a predetermined pipe blocking determination value, it is determined that the blocking occurs in the inside of the pipe member.

Thus, in the present solution means, the blocking portion in the EGR system can be identified based on the pressure difference between the upstream side pressure and the downstream side pressure of the EGR cooler. Accordingly, when the blocking occurs in the inside of the EGR cooler, it is possible to determine the blocking portion with high accuracy. Also, it is possible to distinguish the blocking in the inside of the EGR cooler from the blocking in the inside of the pipe member connected to the EGR cooler with high accuracy, and when components in which the blocking occurs are exchanged, the number of the exchange components can be reduced.

Also, specifically, the reference pressure difference value is a pressure difference value between the upstream side pressure and the downstream side pressure of the EGR cooler in a case where no blocking occurs in any one of the EGR cooler and the pipe member.

As the reference pressure difference value that is the pressure difference value in the case where no blocking occurs and an actual pressure difference value (pressure difference value between the upstream side pressure and the downstream side pressure of the EGR cooler) are compared, this makes it possible to accurately recognize the present degree of blocking in the EGR system and to determine with high accuracy that the actual pressure difference value has reached the cooler blocking determination value or the pipe blocking determination value, which serves as a threshold value in carrying out the failure determination.

The cooler blocking determination value is set as a value corresponding to a blocking degree of the EGR cooler with respect to a deterioration allowance limit of exhaust emission specified in advance.

Also, the pipe blocking determination value is set as a value corresponding to a blocking degree of the pipe member with respect to the deterioration allowance limit of the exhaust emission specified in advance.

That is, when the blocking occurs in the EGR cooler, and the degree of the blocking increases, the exhaust emission starts deteriorating. When the degree of the blocking reaches a degree of the blocking of the EGR cooler corresponding to an allowable limit of the deterioration (so-called OBD regulation value), the pressure difference value to be detected reaches the cooler blocking determination value, and it is determined that the blocking occurs in the inside of the EGR cooler.

Similarly, when the blocking occurs in the pipe member, and the degree of the blocking increases, the exhaust emission starts deteriorating. When the degree of the blocking reaches a degree of the blocking of the pipe member corresponding to an allowable limit of the deterioration (so-called OBD regulation value), the pressure difference value to be detected reaches the pipe blocking determination value, and it is determined that the blocking occurs in the inside of the pipe member.

Thus, each determination value (the cooler blocking determination value and the pipe blocking determination value) is set, so that it can be determined that the blocking occurs when or immediately before the degree of blocking reaches the deterioration allowance limit of exhaust emission, and the blocking portion can be identified. Consequently, this prevents the continuous operation of the internal combustion engine in the state where the exhaust emission exceeds the deterioration allowance limit.

It may be such that the pipe member includes an upstream side pipe member linked to an upstream side of the EGR cooler and a downstream side pipe member linked to a downstream side of the EGR cooler, and the upstream side pressure of the EGR cooler is pressure at a linking portion between the EGR cooler and the upstream side pipe member or at a position nearer to the EGR cooler than to the linking portion. Also, the downstream side pressure of the EGR cooler is pressure at a linking portion between the EGR cooler and the downstream side pipe member or at a position nearer to the EGR cooler than to the linking portion.

According to this, even when the blocking occurs in any portion of the pipe members (the upstream side pipe member and the downstream side pipe member), the pressure difference value to be detected is lower than the pipe blocking determination value, thereby enhancing the determination accuracy in the case where the blocking occurs in the inside of the pipe member. Also, even when pressure at the position nearer to the EGR cooler than to the linking portion is detected, in the case where the blocking occurs in the inside of the EGR cooler, generally, before the blocking occurs in the inside of a pipe integrally connected to the upstream side and the downstream side of the EGR cooler, the blocking occurs in the inside of the EGR cooler. When the pressure difference value is higher than the cooler blocking determination value, it can be determined that the blocking occurs in the inside of the EGR cooler, whereby enhancing the determination accuracy.

The specific configuration of the EGR system and the determination operation of a blocking portion to which the present invention is applied are provided as follows. The EGR system may include a high pressure EGR mechanism configured to recirculate exhaust gas on an upstream side of a turbine of a supercharger in the exhaust system of the internal combustion engine to the intake system, and a low pressure EGR mechanism configured to recirculate exhaust gas on a downstream side of the turbine of the supercharger in the exhaust system to the intake system and include the EGR cooler, and it may be configured to detect a pressure difference between the upstream side pressure and the downstream side pressure of the EGR cooler in the low pressure EGR mechanism, so as to determine a blocking portion in the low pressure EGR mechanism.

Accordingly, this identifies the blocking portion in the low pressure EGR mechanism in which the EGR cooler is provided with respect to so-called MPL-EGR system. When components are exchanged due to the blocking, the number of exchange components can be reduced.

Also, there is provided a pressure difference sensor configured to detect the pressure difference between the upstream side pressure and the downstream side pressure of the EGR cooler, and it may be such that a recirculation amount of the exhaust gas is assumed based on parameters including the pressure difference between the upstream side pressure and the downstream side pressure of the EGR cooler detected by the pressure difference sensor, an opening degree of an EGR valve that adjusts the recirculation amount of the exhaust gas, an exhaust gas temperature, and exhaust gas pressure.

According to this, the pressure difference sensor can be used as both a sensor to identify the blocking portion in the EGR system and a sensor to assume the recirculation amount of exhaust gas in the EGR system.

Effect of the Invention

According to the aspect of the present invention, the blocking portion in the EGR mechanism in which the EGR cooler is applied can be identified based on the pressure difference between the upstream side and the downstream side of the EGR cooler. Accordingly, when the blocking occurs in the inside of the EGR cooler, it can be determined that the blocking occurs with high accuracy. Also, it is possible to distinguish the blocking in the inside of the EGR cooler from the blocking in the inside of the pipe member connected to the EGR cooler with high accuracy.

MODES FOR CARRYING OUT THE INVENTION

Figure 1:
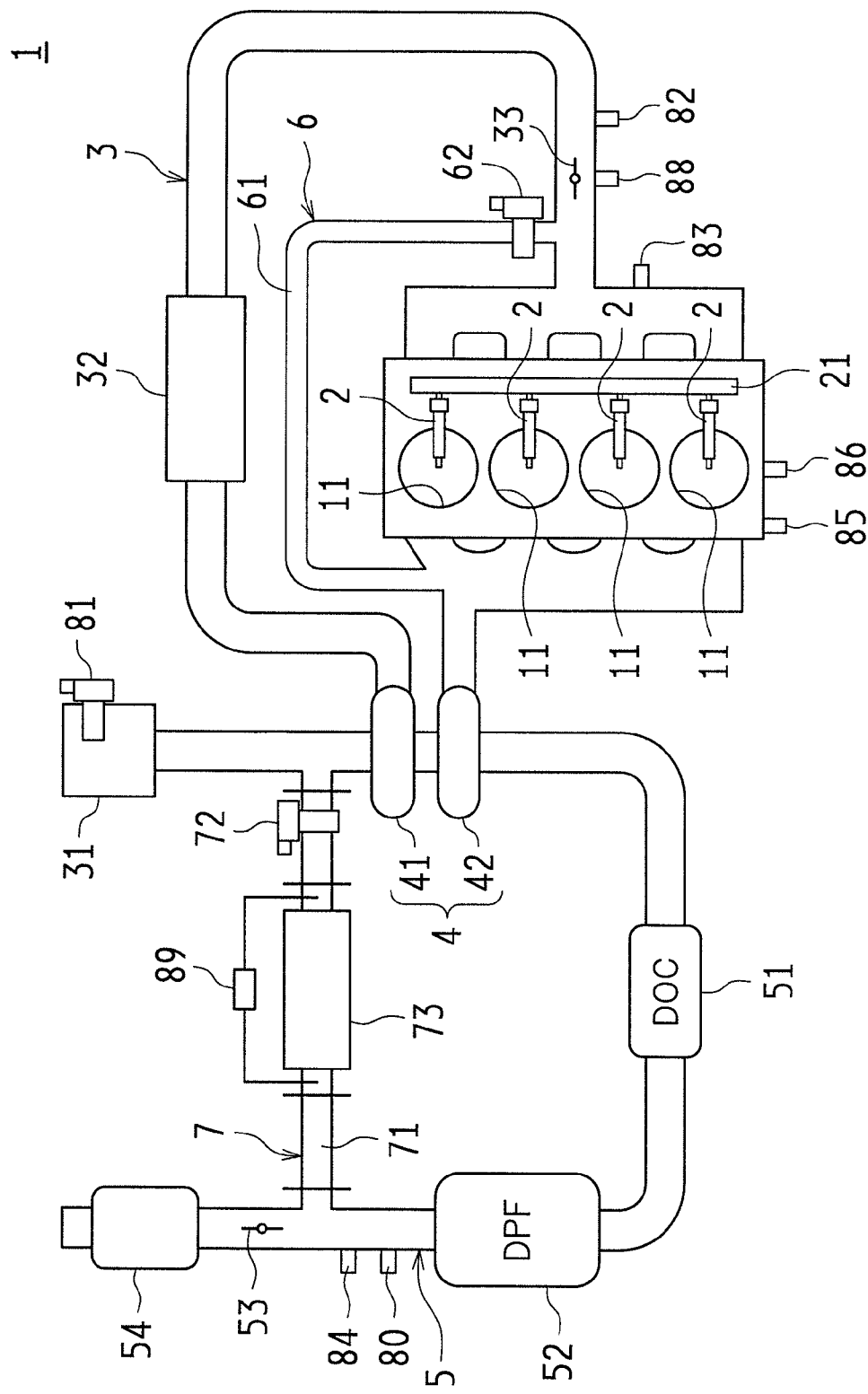
FIG. 1 is a schematic configuration diagram illustrating an engine according to the present embodiment.

Hereinafter, embodiments of the present invention will be described below referring to the drawings. In the present embodiment, description will be given with regard to a case where the present invention is applied to a common rail in-cylinder direct injection multi-cylinder (for example, inline four-cylinder) diesel engine (compression self-igniting internal combustion engine) mounted in an automobile. Also, as an EGR system, a case will be described where the present invention is applied to a diesel engine equipped with a MPL-EGR system including a high pressure EGR mechanism and a low pressure EGR mechanism.

—Engine Configuration—

FIG. 1 is a schematic configuration diagram illustrating an engine (internal combustion engine) 1 according to the present embodiment. The engine 1 shown in FIG. 1 is a diesel engine including four cylinders 11, and injectors (fuel injection valve) 2 that can directly inject fuel into the cylinders 11 are provided for the cylinders 11. For example, the injectors 2 are configured as piezo injectors within which a piezoelectric element (piezo element) is disposed and which supply fuel by injection into the injectors 11 by appropriately opening a valve. Also, fuel of which pressure is increased by a high pressure fuel pump not shown is provided for the injectors 2 via a common rail 21.

An intake path 3 constituting an intake system is connected to each cylinder 11. An air cleaner 31 is provided at an upstream end of the intake path 3. Also, in the midst of the intake path 3 along the direction of the flow of intake air, a compressor 41 of a turbocharger (centrifugal supercharger) 4, an intercooler 32, and an intake throttle valve (diesel throttle) 33 are provided in this order. After the intake air introduced to the intake path 3 is purified by the air cleaner 31, the intake air is supercharged by the compressor 41 and cooled by the intercooler 32. Subsequently, the intake air is introduced into each cylinder 11 through the intake throttle valve 33. The intake air introduced into each cylinder 11 is compressed in the compression process, and fuel is injected from the injectors 2 to the cylinders 11 so as to carry out fuel combustion. Accompanied with this fuel combustion, the reciprocating movement of the piston not shown in the cylinder 11 rotates the crankshaft via the connecting rod so as to obtain engine output.

It is noted that the intake throttle valve 33 is fully opened in the regular operation and is, for example, closed to a predetermined opening degree at the time of decreasing speeds of a vehicle as needed (such as in the case where it is necessary to prevent the temperature reduction of an oxidation catalyst 51 described later).

An exhaust path 5 constituting an exhaust system is connected to each cylinder 11. In the midst of the exhaust path 5, a turbine 42 of the turbocharger 4 is provided. On the downstream of the exhaust path 5 with respect to the turbine 42, an oxidation catalyst (DOC; Diesel Oxidation Catalyst) 51, a particulate filter (DPF; Diesel Particulate Filter) 52, an exhaust throttle valve 53, a muffler 54 are provided in this order along the flow of the exhaust.

The exhaust gas (burned gas) generated by the combustion in each cylinder 11 is discharged to the exhaust path 5. After the exhaust gas discharged to the exhaust path 5 passes through the turbine 42 provided in the midst of the exhaust path 5, the exhaust gas is purified by the oxidation catalyst 51 and the particulate filter 52, and subsequently, is released in the atmosphere via the exhaust throttle valve 53 and the muffler 54.

—EGR System—

An MPL-EGR system including an HPL-EGR mechanism (high pressure EGR mechanism) 6 and an LPL-EGR mechanism (low pressure EGR mechanism) 7 is provided in the engine 1 according to the present embodiment.

The HPL-EGR mechanism 6 includes a high pressure EGR path 61 that introduces part of the exhaust gas (high pressure EGR gas) from the exhaust path 5 on the upstream with respect to the turbine 42 of the turbocharger 4 (for example, an exhaust manifold) to the intake path 3 on the downstream with respect to the intake throttle valve 33 (downstream with respect to the compressor 41), and a high pressure EGR valve 62 that can change the flow path area of the high pressure EGR path 61.

The amount of the high pressure EGR gas to be recirculated (re-circulated) by the HPL-EGR mechanism 6 is adjusted based on the opening degree of the high pressure EGR valve 62. Also, the opening degree of the intake throttle valve 33 is reduced (closing degree is increased) as needed, and in some cases, the recirculation amount of the high pressure EGR gas is increased.

In contrast, the LPL-EGR mechanism 7 includes a low pressure EGR path 71 that introduces part of the exhaust gas (low pressure EGR gas) from the exhaust path 5 on the downstream with respect to the particulate filter 52 (downstream with respect to the turbine 42) and on the upstream with respect to the exhaust throttle valve 53 to the intake path 3 on the upstream with respect to the compressor 41, a low pressure EGR valve 72 that can change the flow path area of the low pressure EGR path 71, and a low pressure EGR cooler 73 to cool the low pressure EGR gas flowing through the low pressure EGR path 71.

The amount of the low pressure EGR gas to be recirculated (re-circulated) by the LPL-EGR mechanism 7 is adjusted based on the opening degree of the low pressure EGR valve 72. Also, the opening degree of the exhaust throttle valve 53 is reduced as needed, and in some cases, the recirculation amount of the low pressure EGR gas is increased due to this adjustment.

—Specific Configuration of LPL-EGR Mechanism—

Hereinafter, the configuration of the LPL-EGR mechanism 7 will specifically be described.

Figure 2:
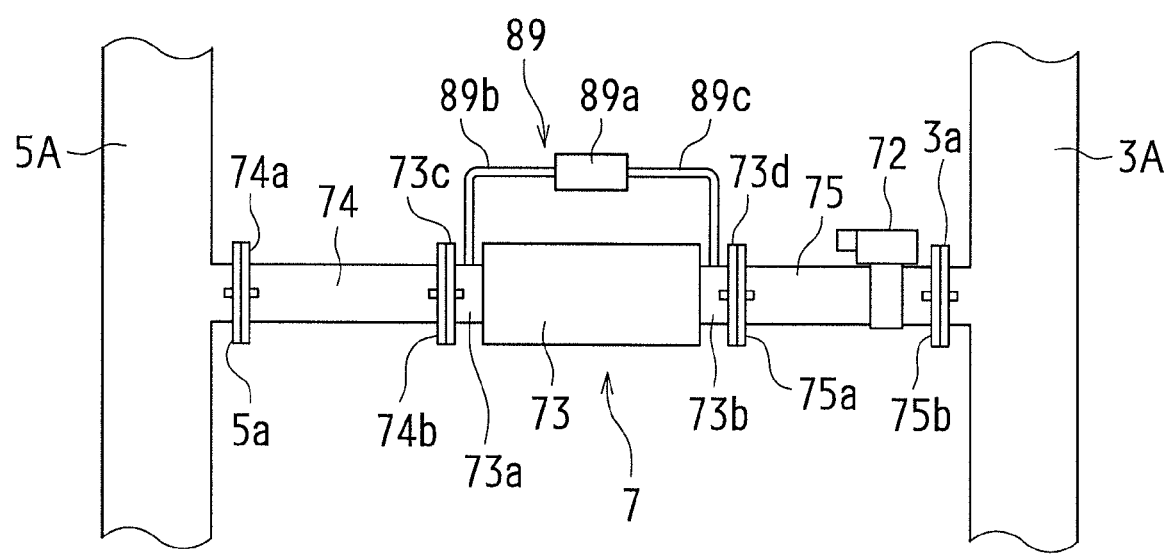
FIG. 2 is a diagram illustrating a configuration of an LPL-EGR mechanism.

FIG. 2 is a diagram illustrating the LPL-EGR mechanism 7. As shown in FIG. 2, the LPL-EGR mechanism 7 includes an upstream side pipe 74, the low pressure EGR cooler 73, a downstream side pipe 75, the low pressure EGR valve 72, and a pressure difference sensor 89.

The upstream side pipe 74 is a metallic pipe and a piping member to introduce the exhaust gas in an exhaust pipe 5A to the low pressure EGR cooler 73, and one end thereof is connected to the exhaust pipe (pipe constituting the exhaust path 5) 5A, and the other end thereof is connected to the low pressure EGR cooler 73. An upstream side flange 74a and a downstream side flange 74b, each of which has a bolt hole not shown, are integrally formed at both ends in the longitudinal direction of the upstream side pipe 74. It is noted that the upstream side pipe 74 may be formed by a pipe made of resin or rubber.

Also, an introducing pipe member 73a to introduce the EGR gas and a leading pipe member 73b to lead the EGR gas are provided for the low pressure EGR cooler 73. Also, an upstream side flange 73c and a downstream side flange 73d are integrally formed respectively on the introducing pipe member 73a and leading pipe member 73b. Also, a bolt hole not shown is formed in these flanges 73c and 73d.

Further, the downstream side pipe 75 is a metallic pipe and a piping member to introduce the EGR gas flowing through the low pressure EGR cooler 73 to an intake pipe 3A, and one end thereof is connected to the low pressure EGR cooler 73, and the other end thereof is connected to the intake pipe (pipe constituting the intake path 3) 3A. Then, an upstream side flange 75a and a downstream side flange 75b, each of which has a bolt hole not shown, are integrally formed at both ends in the longitudinal direction of the downstream side pipe 75. It is noted that the downstream side pipe 75 may be formed by a pipe made of resin or rubber.

Also, flanges 5a and 3a that are a similar flange described above are formed at connecting portions of the exhaust pipe 5A and the intake pipe 3A in the LPL-EGR mechanism 7.

Then, the flange 5a of the exhaust pipe 5A and the upstream side flange 74a of the upstream side pipe 74 are superimposed, and the downstream side flange 74b of the upstream side pipe 74 and the upstream side flange 73c of the low pressure EGR cooler 73 are superimposed, and the downstream side flange 73d of the low pressure EGR cooler 73 and the upstream side flange 75a of the downstream side pipe 75 are superimposed, further the downstream side flange 75b of the downstream side pipe 75 and the flange 3a of the intake pipe 3A are superimposed and these flanges are integrally fastened with bolts. Accordingly, the LPL-EGR mechanism 7 is such that three members of the upstream side pipe 74, the low pressure EGR cooler 73, and the downstream side pipe 75 are connected with each other in a manner that the EGR gas can be circulated, and each of the members can individually be replaced (component replacement).

Also, the low pressure EGR valve 72 is provided for the downstream side pipe 75.

Also, the pressure difference sensor 89 is configured such that an upstream side gas introducing pipe 89b and a downstream side gas introducing pipe 89c are connected to a sensor body 89a. The upstream side gas introducing pipe 89b is connected to the introducing pipe member 73a of the low pressure EGR cooler 73 to introduce internal pressure of the introducing pipe member 73a to the sensor body 89a. In contrast, the downstream side gas introducing pipe 89c is connected to the leading pipe member 73b of the low pressure EGR cooler 73 to introduce internal pressure of the leading pipe member 73b to the sensor body 89a. Accordingly, the sensor body 89a outputs a pressure difference signal in accordance with a pressure difference between the internal pressure of the introducing pipe member 73a and the internal pressure of the leading pipe member 73b (a pressure difference between the upstream side pressure and the downstream side pressure of the low pressure EGR cooler 73) to an ECU (Electronic Control Unit) 10 described later.

—Control System—

Figure 3:
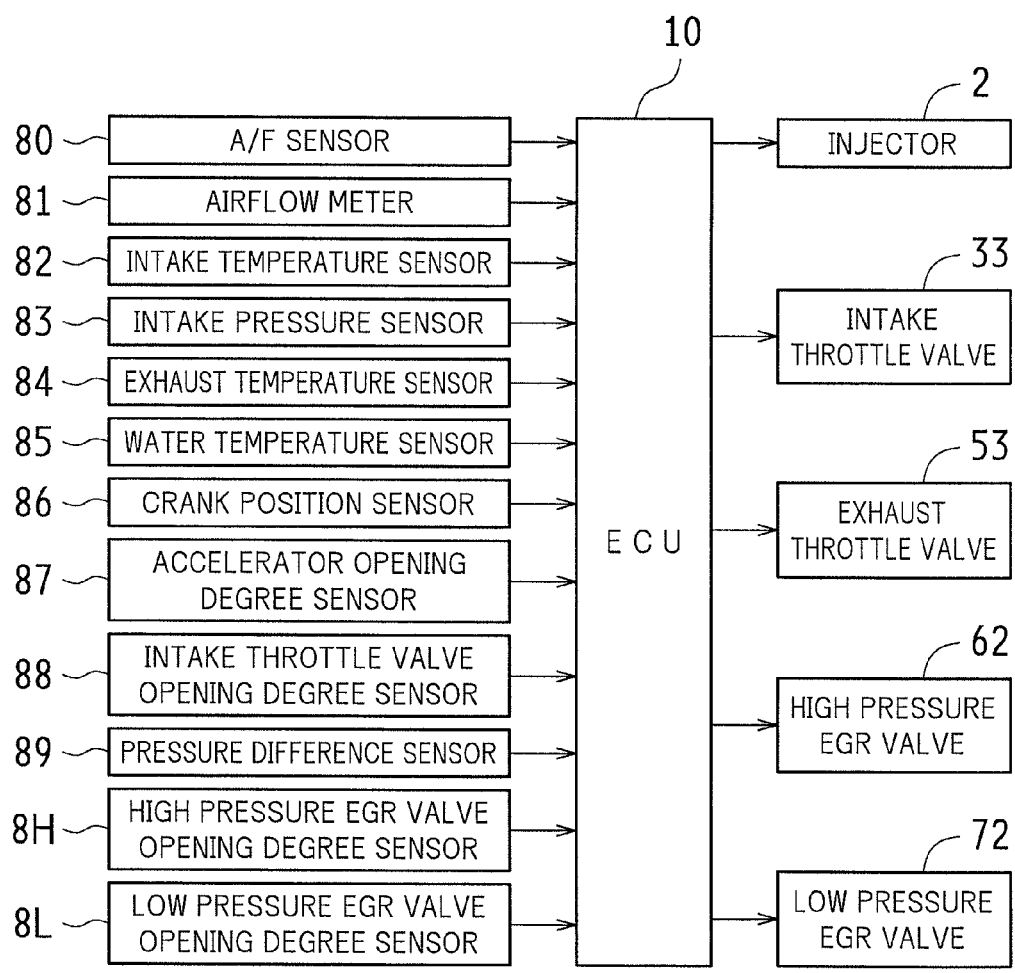
FIG. 3 is a block diagram illustrating a configuration of a control system such as an ECU.

As shown in FIG. 3, the injectors 2, the intake throttle valve 33, the exhaust throttle valve 53, the high pressure EGR valve 62, and the low pressure EGR valve 72 are electrically connected to the ECU 10.

The ECU 10 is electrically connected to various sensors such as an A/F sensor 80, an airflow meter 81, an intake temperature sensor 82, an intake pressure sensor 83, an exhaust temperature sensor 84, a water temperature sensor 85, a crank position sensor 86, an accelerator opening degree sensor 87, an intake throttle valve opening degree sensor 88, the pressure difference sensor 89 described above, a high pressure EGR valve opening degree sensor 8H, a low pressure EGR valve opening degree sensor 8L, and the like.

The A/F sensor 80 is a sensor to detect the density of oxygen in the exhaust on the downstream of the particulate filter 52 and outputs a detection signal that successively changes corresponding to the density of oxygen. The airflow meter 81 is a sensor to measure the amount of air flowed from the atmosphere into the intake path 3. The intake temperature sensor 82 is a sensor to detect the temperature of air (temperature on the upstream side of the intake throttle valve 33) flowing through the intake path 3. The intake pressure sensor 83 is a sensor to detect pressure on the downstream side of the intake throttle valve 33 (for example, in the intake manifold). The exhaust temperature sensor 84 is a sensor to detect a temperature of the exhaust gas flowing through the exhaust path 5 (temperature on the upstream side of the exhaust throttle valve 53). The water temperature sensor 85 is a sensor to detect a temperature of coolant circulating in the inside of the engine 1. The crank position sensor 86 is a sensor to detect a rotational position of the crankshaft of the engine 1. The accelerator opening degree sensor 87 is a sensor to detect an amount of operation of an accelerator pedal by a driver (accelerator opening degree). The intake throttle valve opening degree sensor 88 is a sensor to detect the opening degree of the intake throttle valve 33. The pressure difference sensor 89 is a sensor to measure a pressure difference between the upstream side pressure and the downstream side pressure of the low pressure EGR cooler 73 in the LPL-EGR mechanism 7 as described above. The high pressure EGR valve opening degree sensor 8H is a sensor to detect an opening degree of the high pressure EGR valve 62. The low pressure EGR valve opening degree sensor 8L is a sensor to detect an opening degree of the low pressure EGR valve 72.

The ECU 10 controls the injectors 2, the intake throttle valve 33, the exhaust throttle valve 53, the high pressure EGR valve 62, and the low pressure EGR valve 72 based on the detection values and measured values of various sensors 80 to 89, 8H, and 8L described above.

For example, the ECU 10 controls the using state of the HPL-EGR mechanism 6 and the LPL-EGR mechanism 7 in accordance with the operating states of the engine 1 (engine loads and the like).

Figure 4:
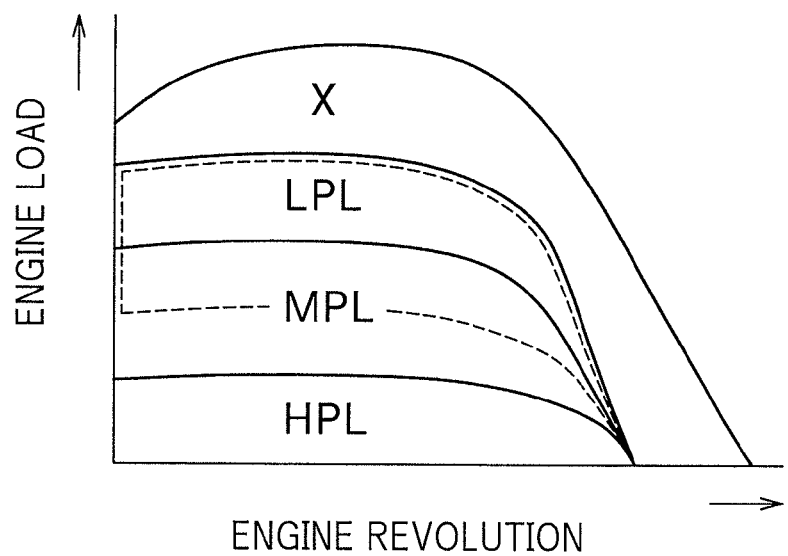
FIG. 4 is a diagram illustrating a map to set a mode of an MPL-EGR system during a warm-up of the engine.

Specifically, when the engine 1 is warm (for example, when the temperature of the coolant is equal to or higher than 60° C.), the EGR mechanisms 6 and 7 to be used are selected in accordance with a map of FIG. 4. That is, when the engine 1 is in a low load operating state, the ECU 10 utilizes the HPL-EGR mechanism 6 so as to recirculate the exhaust gas (recirculation operation in the high pressure EGR area). When the engine 1 is in a high load operating state, the ECU 10 recirculates the exhaust gas by the LPL-EGR mechanism 7 (recirculation operation in the low pressure EGR area). When the engine 1 is in a moderate load operating state, the ECU 10 utilizes both the HPL-EGR mechanism 6 and the LPL-EGR mechanism 7 so as to recirculate the exhaust gas (recirculation operation in the MPL area). These concrete controls will be described later. It is noted that, when the required acceleration for a vehicle is high (at the time of transitional operation) and the like, an area X in FIG. 4 is an operating area where both the high pressure EGR valve 62 of the HPL-EGR mechanism 6 and the low pressure EGR valve 72 of the LPL-EGR mechanism 7 are closed, that is, an operating area where the recirculation of the EGR gas is not carried out.

Thus, an appropriate amount of EGR gas can be recirculated in the comprehensive operating area of the engine 1, when the form of use in terms of the HPL-EGR mechanism 6 and the LPL-EGR mechanism 7 is switched or when the EGR mechanisms 6 and 7 are both used in accordance with the operating state of the engine 1, and the density of the NOx in the exhaust can be favorably be decreased.

Figure 5:
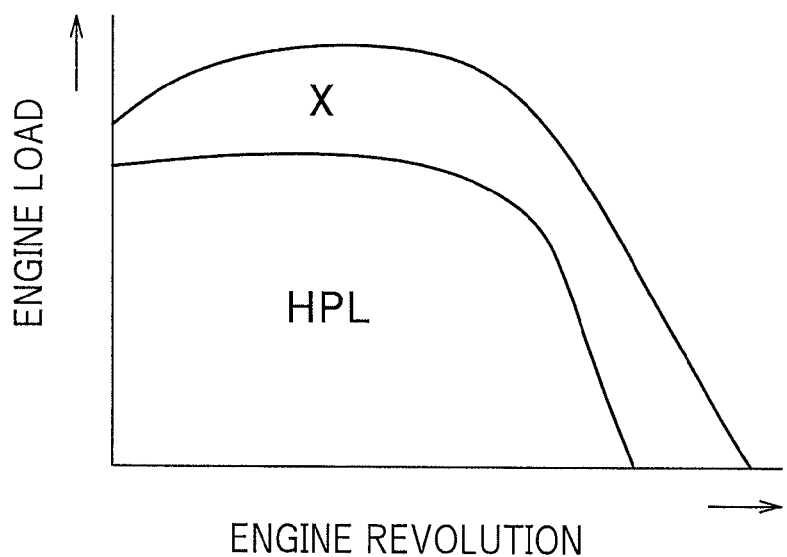
FIG. 5 is a diagram illustrating a map to set a mode of the MPL-EGR system during a cooling of the engine.

In contrast, when the engine 1 is cool, as shown in a map of FIG. 5, the ECU 10 utilizes the HPL-EGR mechanism 6 to recirculate the exhaust gas in the operating areas except the area X described above, irrespective of the load of the engine 1. This is because the utilization of the HPL-EGR mechanism 6 that does not include an EGR cooler allows the exhaust gas having a relatively high temperature to be recirculated, so as to achieve the early warm-up of the engine 1 and the early activation of the oxidation catalyst 51.

—Basic Control of MPL-EGR System—

Next, basic control of MPL-EGR system will be described.

The control of the amount of EGR gas in the HPL-EGR mechanism 6 and the control of the amount of EGR gas in the LPL-EGR mechanism 7 will be described. The control of the amount of EGR gas in the HPL-EGR mechanism 6 and the control of the amount of EGR gas in the LPL-EGR mechanism 7 are individually carried out.

When the EGR gas is recirculated using the HPL-EGR mechanism 6 (including a case where the LPL-EGR mechanism 7 is jointly used), the recirculation amount of EGR gas to be targeted (hereinafter referred to as "target high pressure EGR gas recirculation amount") and the recirculation amount of EGR gas to be assumed (hereinafter referred to as "assumption high pressure EGR gas recirculation amount") are compared, and feedback control (hereinafter referred to as "EGR feedback control") is carried out for the opening degree of the high pressure EGR valve 62 and the opening degree of the intake throttle valve 33 in such a manner that the assumption high pressure EGR gas recirculation amount is brought close to the target high pressure EGR gas recirculation amount. The target high pressure EGR gas recirculation amount of this case is set in accordance with the operating state of the engine 1 (in particular, engine load). Also, the assumption high pressure EGR gas recirculation amount is obtained based on a predetermined mathematical formula or a map stored in advance in a ROM (Read Only Memory) of the ECU 10, wherein the opening degree of the high pressure EGR valve 62 that is detected by the high pressure EGR valve opening degree sensor 8H, the temperature of intake air that is detected by the intake temperature sensor 82, the pressure in the intake manifold that is detected by the intake pressure sensor 83, and a pressure difference between the pressure in the intake manifold and the pressure in an exhaust manifold are used as parameters. It is noted that the pressure in the exhaust manifold is obtained based on a predetermined mathematical formula or a map stored in advance in a ROM of the ECU 10, wherein the pressure in the intake manifold, the operating state amount of the engine 1, and the like are used as parameters.

In contrast, when the EGR gas is recirculated using the LPL-EGR mechanism 7 (including a case where the HPL-EGR mechanism 6 is jointly used), the recirculation amount of EGR gas to be targeted (hereinafter referred to as "target low pressure EGR gas recirculation amount") and the recirculation amount of EGR gas to be assumed (hereinafter referred to as "assumption low pressure EGR gas recirculation amount") are compared, and the feedback control (EGR feedback control) is carried out for the opening degree of the low pressure EGR valve 72 and the opening degree of the exhaust throttle valve 53 in such a manner that the assumption low pressure EGR gas recirculation amount is brought close to the target low pressure EGR gas recirculation amount. The target low pressure EGR gas recirculation amount of this case is set in accordance with the operating state of the engine 1 (in particular, engine load). Also, the assumption low pressure EGR gas recirculation amount is obtained based on a predetermined mathematical formula or a map stored in advance in the ROM of the ECU 10, wherein the opening degree of the low pressure EGR valve 72 that is detected by the low pressure EGR valve opening degree sensor 8L, the exhaust temperature detected by the exhaust temperature sensor 84, the exhaust pressure on the downstream of the particulate filter 52 and a pressure difference between the upstream side pressure and the downstream side pressure of the low pressure EGR cooler 73 that is detected by the pressure difference sensor 89 are used as parameters. It is noted that the exhaust pressure on the downstream of the particulate filter 52 is obtained based on a predetermined mathematical formula or a map stored in advance in the ROM of the ECU 10, wherein the pressure in the intake manifold, the operating state amount of the engine 1, and the like are used as parameters.

Hereinafter, a basic operation of the MPL-EGR system corresponding to the load of the engine 1 (basic operation of the HPL-EGR mechanism 6 and the LPL-EGR mechanism 7) will be described.

(Time of Low Load Operation)

As is described above, when the engine load is relatively low (low load area), the EGR gas is recirculated using the HPL-EGR mechanism 6 only. This operating area is referred to as an HPL area. When the temperature of the coolant is low, the EGR gas is also recirculated using the HPL-EGR mechanism 6 only.

In the EGR feedback control in the HPL area, the target high pressure EGR gas recirculation amount is set in such a manner that the intake air amount detected by the airflow meter 81 corresponds with a target intake air amount set in accordance with the engine load, engine revolution, and the like. As is described above, the feedback control is carried out for the opening degree of the high pressure EGR valve 62 in a manner that the assumption high pressure EGR gas recirculation amount corresponds with the target high pressure EGR gas recirculation amount. In this time, the low pressure EGR valve 72 has been left to be fully closed.

For example, when the intake air amount obtained by the airflow meter 81 is smaller than a target value, and an actual EGR ratio is higher than the target EGR ratio (EGR ratio determined corresponding to the operating state of the engine 1 and the like), the assumption high pressure EGR gas recirculation amount is larger than the target high pressure EGR gas recirculation amount, so that the opening degree of the high pressure EGR valve 62 is reduced in a manner as to decrease the amount of EGR gas.

Also, when the intake air amount obtained by the airflow meter 81 is greater than the target value, and the actual EGR ratio is lower than a target EGR ratio, the assumption high pressure EGR gas recirculation amount is smaller than the target high pressure EGR gas recirculation amount, so that the opening degree of the high pressure EGR valve 62 is enhanced in a manner as to increase the amount of EGR gas. When thus the opening degree of the high pressure EGR valve 62 is enhanced, but the assumption high pressure EGR gas recirculation amount does not reach the target high pressure EGR gas recirculation amount, the opening degree of the intake throttle valve 33 is reduced (closing degree is increased) to drop the pressure on the downstream side of the intake throttle valve 33, so as to increase the amount of EGR gas to be recirculated through the high pressure EGR path 61. Consequently, the actual EGR ratio is brought close to the target EGR ratio.

Hereinafter, a control mode for which the EGR gas is recirculated using the HPL-EGR mechanism 6 only is referred to as an HPL mode. It is noted that the target value of the intake air amount and the target value of the amount of EGR gas may be set as a target range with a certain degree of allowance. Also, when the amount of EGR gas is directly measured by the sensors and the like, the opening degree of the high pressure EGR valve 62 may be adjusted in a manner that the amount of EGR gas is set to the target value or the target range.

(Time of High Load Operation)

As is described above, when the engine load is relatively high (high load area), the EGR gas is recirculated using the LPL-EGR mechanism 7 only. This operating area is referred to as an LPL area.

In the EGR feedback control in the LPL area, the target low pressure EGR gas recirculation amount is set in such a manner that the intake air amount detected by the airflow meter 81 corresponds with the target intake air amount set in accordance with the engine load, the engine revolution, and the like. As is described above, the feedback control is carried out for the opening degree of the low pressure EGR valve 72 in a manner that the assumption low pressure EGR gas recirculation amount corresponds with the target low pressure EGR gas recirculation amount. In this time, basically (as long as the amount of EGR gas is not insufficient), the high pressure EGR valve 62 is left to be fully closed.

For example, when the intake air amount obtained by the airflow meter 81 is smaller than the target value, and the actual EGR ratio is higher than the target EGR ratio, the assumption low pressure EGR gas recirculation amount is larger than the target low pressure EGR gas recirculation amount, so that the opening degree of the low pressure EGR valve 72 is reduced in a manner as to decrease the amount of EGR gas.

Also, when the intake air amount obtained by the airflow meter 81 is greater than the target value, and the actual EGR ratio is lower than the target EGR ratio, the assumption low pressure EGR gas recirculation amount is smaller than the target low pressure EGR gas recirculation amount, so that the opening degree of the low pressure EGR valve 72 is enhanced in a manner as to increase the amount of EGR gas. When thus the opening degree of the low pressure EGR valve 72 is enhanced, but the assumption low pressure EGR gas recirculation amount does not reach the target low pressure EGR gas recirculation amount, the opening degree of the high pressure EGR valve 62 is enhanced, or the opening degree of the exhaust throttle valve 53 is reduced (closing degree is enhanced) so as to increase the amount of EGR gas. Consequently, the actual EGR ratio is brought close to the target EGR ratio.

Hereinafter, a control mode for which the EGR gas is recirculated using the LPL-EGR mechanism 7 only is referred to as an LPL mode. It is noted that the target value of the intake air amount and the target value of the amount of EGR gas may be set as a target range with a certain degree of allowance. Also, when the amount of EGR gas is directly measured by the sensors and the like, the opening degree of the low pressure EGR valve 72 may be adjusted in a manner that the amount of EGR gas is set to the target value or the target range.

(Time of Moderate Load Operation)

As is described above, when the engine is in a moderate load operation (moderate load area), the EGR gas is recirculated using both the HPL-EGR mechanism 6 and the LPL-EGR mechanism 7. An operating area between the HPL area and the LPL area is referred to as an MPL area.

In the EGR feedback control in the MPL area, the target intake air amount and the target EGR ratio (=high pressure EGR gas recirculation amount+low pressure EGR gas recirculation amount/high pressure EGR gas recirculation amount+low pressure EGR gas recirculation amount+intake air amount) are determined in accordance with the engine load, the engine revolution and the like, and the total amount of EGR gas is set based on these values. Also, an EGR distribution ratio (ratio of the amount of high pressure EGR gas recirculated by the HPL-EGR mechanism 6 to the amount of low pressure EGR gas recirculated by the LPL-EGR mechanism 7) is determined in accordance with the engine load and the like. Then, the amount of high pressure EGR gas to be targeted (target high pressure EGR gas recirculation amount) and the amount of low pressure EGR gas to be targeted (target low pressure EGR gas recirculation amount) are obtained by multiplying the distribution ratio of the high pressure EGR gas (=high pressure EGR gas recirculation amount/high pressure EGR gas recirculation amount+low pressure EGR gas recirculation amount) and the distribution ratio of the low pressure EGR gas (=low pressure EGR gas recirculation amount/high pressure EGR gas recirculation amount+low pressure EGR gas recirculation amount) by the total amount of EGR gas.

As the control of the HPL-EGR mechanism 6, the opening degree of the high pressure EGR valve 62 is controlled in a manner that the assumption high pressure EGR gas recirculation amount reaches the target high pressure EGR gas recirculation amount. The control of the opening degree of the high pressure EGR valve 62 is similar to the case of the low load operation described above.

In contrast, as the control of the LPL-EGR mechanism 7, the opening degree of the low pressure EGR valve 72 is controlled in a manner that the assumption low pressure EGR gas recirculation amount reaches the target low pressure EGR gas recirculation amount. The control of the opening degree of the low pressure EGR valve 72 is similar to the case of the high load operation described above.

Hereinafter, a control mode for which the EGR gas is supplied using both the HPL-EGR mechanism 6 and the LPL-EGR mechanism 7 is referred to as an MPL mode. It is noted that the target value of the intake air amount and the target value of the amount of EGR gas may be set as a target range with a certain degree of allowance. Also, when the amount of EGR gas is directly measured by the sensors and the like, the opening degrees of the low pressure EGR valve 72 and the high pressure EGR valve 62 may be adjusted in a manner that the amount of EGR gas is set to the target value or the target range.

—Failure Diagnosis Operation of LPL-EGR Mechanism 7—

Next, a failure diagnosis operation of the LPL-EGR mechanism 7, which is the features of the present embodiment, will be described. The failure diagnosis operation is such that, when there occurs blocking in the inside of the LPL-EGR mechanism 7, out of the upstream side pipe 74, the low pressure EGR cooler 73, and the downstream side pipe 75 that are members constituting the LPL-EGR mechanism 7, it is determined whether the blocking occurs in the inside of the low pressure EGR cooler 73 or the blocking occurs in the inside of the upstream side pipe 74 or the downstream side pipe 75.

Hereinafter, the outline of the failure diagnosis operation of the LPL-EGR mechanism 7 will be described.

In the failure diagnosis operation, a pressure difference between the upstream side pressure and the downstream side pressure of the low pressure EGR cooler 73 (more specifically, a pressure difference between the internal pressure of the introducing pipe member 73a and the internal pressure of the leading pipe member 73b) is measured by the pressure difference sensor 89. Then, a value of this pressure difference (hereinafter also referred to "actual pressure difference value") and a value of a pressure difference in the case where no blocking occurs in the inside of the LPL-EGR mechanism 7 (hereinafter also referred to "reference pressure difference value") are compared. The reference pressure difference value is obtained in advance based on an experiment or a simulation.

Then, when the actual pressure difference value with respect to the reference pressure difference value is equal to or higher than a predetermined value (when the actual pressure difference value is higher than the reference pressure difference value with a deviation having a predetermined value or higher), it is determined that the blocking occurs in the inside of the low pressure EGR cooler 73. In contrast, when the actual pressure difference value with respect to the reference pressure difference value is equal to or lower than a predetermined value (when the actual pressure difference value is lower than the reference pressure difference value with a deviation having a predetermined value or higher), it is determined that the blocking occurs in the inside of the upstream side pipe 74 or the downstream side pipe 75.

Incidentally, the predetermined value (deviation) to determine that the blocking occurs is set as one corresponding to a pressure difference in the case where there occurs a blocking state to be determined as "blocking" based on the legal regulations and the like (which is described in detail later).

Figure 6:
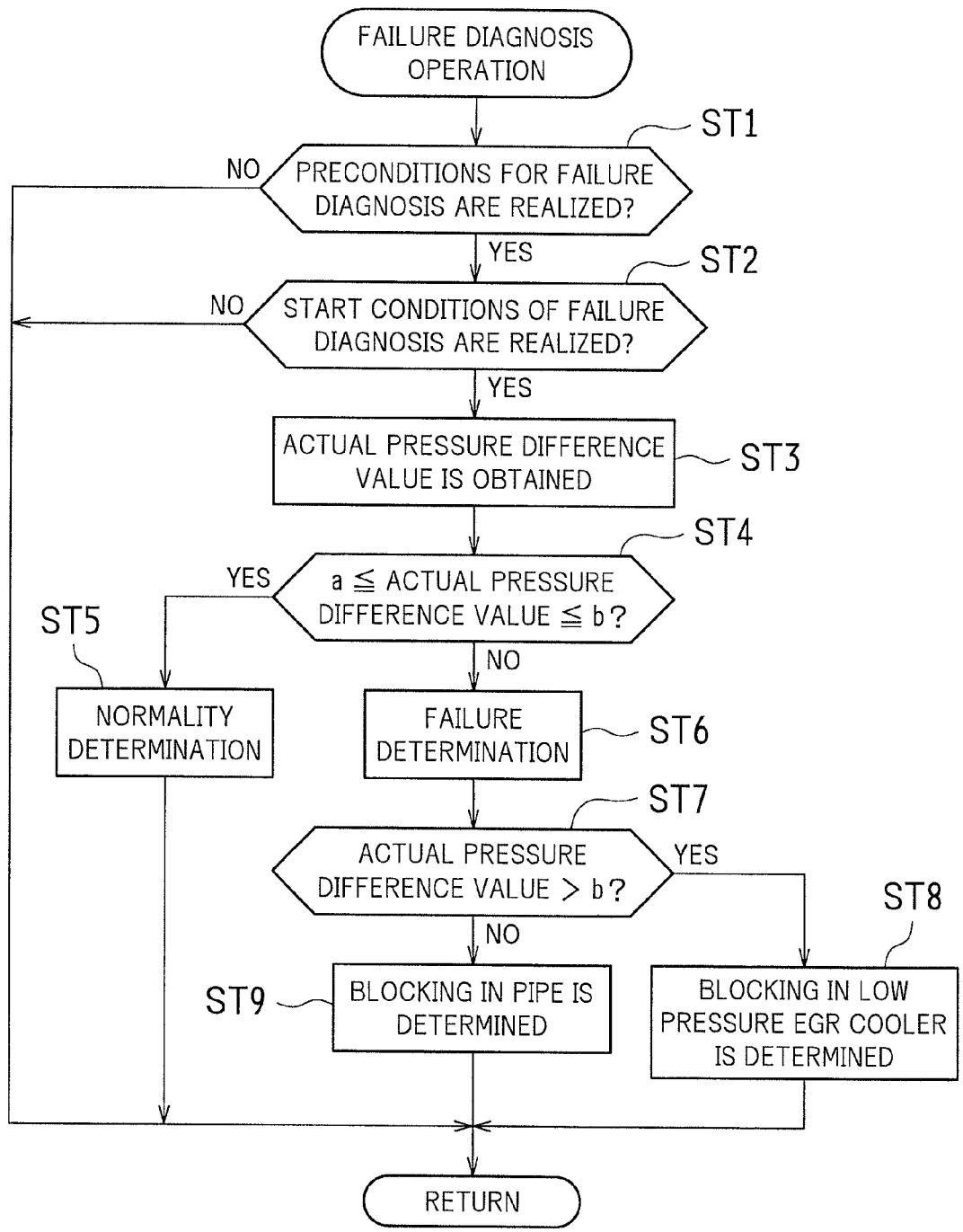
FIG. 6 is a flowchart illustrating a procedure for a failure diagnosis operation in the MPL-EGR system.

Hereinafter, a concrete procedure of the failure diagnosis operation of the MPL-EGR system will be described referring to a flowchart of FIG. 6. This flowchart is carried out at a predetermined timing (for example, one time in 1 trip of the vehicle (period ranging from a time when the ignition is turned on to a time when the ignition is turned off)).

First, at a step ST1, it is determined whether preconditions to execute the failure diagnosis operation are realized. The preconditions are exemplified by, for example, one wherein the pressure difference sensor 89 is properly operated, one wherein no failure occurs in the high pressure EGR valve 62 and the low pressure EGR valve 72, and one wherein the operating mode of the engine 1 is a regular combustion mode. The determination on whether the pressure difference sensor 89 is properly operated and the determination on whether the EGR valves 62 and 72 are properly operated can be executed based on a known determination operation, so that the description will be omitted. Also, the regular combustion mode of the engine 1 is an operating mode for which the EGR gas is recirculated, which is a case where the required acceleration for the vehicle is not high, or a state where the particulate filter 52 is not at the time of regeneration operation.

When any one of these preconditions is not realized, the determination is NO at a step ST1, where the process is returned because the failure diagnosis operation is not executable.

In contrast, when all the preconditions are realized, the determination is YES at the step ST1, the process goes to a step ST2, where it is determined whether start conditions of the failure diagnosis operation are realized. The start conditions of the failure diagnosis operation are exemplified by, for example, one wherein the engine revolution is within a predetermined range, one wherein the fuel injection amount from the injectors 2 is within a predetermined range, and one wherein the opening degree of the low pressure EGR valve 72 is within a predetermined range. That is, the amount of EGR gas is set to "0" at the transitional operation of the engine 1, and for this reason, the start conditions of the failure diagnosis operation are defined as one wherein these conditions are not applied. Also, when the fuel injection amount is set to "0" at the time of decreasing speeds of a vehicle, and the like, and the opening degree of the intake throttle valve 33 is reduced in order to restrain the temperature reduction of the oxidation catalyst 51 by decreasing the amount of exhaust, the amount of EGR gas is also set to "0", and for this reason, the start conditions of the failure diagnosis operation are set as one wherein these conditions are not applied. Further, in order to fully obtain the reliability of the sensing values of the pressure difference obtained by the pressure difference sensor 89, it is necessary to secure a certain degree of the flow amount of EGR gas in the low pressure EGR path 71, and for this reason, the start conditions of the failure diagnosis operation are set one wherein the opening degree of the low pressure EGR valve 72 is within a predetermined range. Specifically, an engine operating area in which the opening degree of the low pressure EGR valve 72 is within a predetermined range is an area enclosed in a dashed line in FIG. 4. That is, the area is applied when the LPL mode is set, or is an operating area on a relatively high load side in the MPL mode.

When any one of these start conditions of the failure diagnosis operation is not realized, the determination is NO at a step ST2, where the process is returned, because the failure diagnosis operation is not executable.

In contrast, when the start conditions of the failure diagnosis operation are realized, the determination is YES at the step ST2, the process goes to a step ST3, where information on a pressure difference (actual pressure difference value) between the upstream side pressure and the downstream side pressure of the low pressure EGR cooler 73 that is detected by the pressure difference sensor 89 is obtained.

Subsequently, the process goes to a step ST4, where it is determined whether the pressure difference value (actual pressure difference value) is within a range that is equal to or higher than a predetermined value a (a pipe blocking determination value according to the present invention) and that is equal to or lower than a predetermined value b (a cooler blocking determination value according to the present invention) (a≤actual pressure difference value≤b).

As is described above, the predetermined values a and b are set as one corresponding to a pressure difference in the case where there occurs a blocking state to be determined as "blocking" based on the legal regulations and the like. For example, the predetermined value a is set as a value corresponding to the degree of blocking that serves as a threshold value to determine that the blocking occurs in the inside of the upstream side pipe 74 or the downstream side pipe 75, and the predetermined value b is set as a value corresponding to the degree of blocking that serves as a threshold value to determine that the blocking occurs in the inside of the low pressure EGR cooler 73.

Incidentally, the method of setting the predetermined value a and the predetermined value b will be described.

Figure 7:
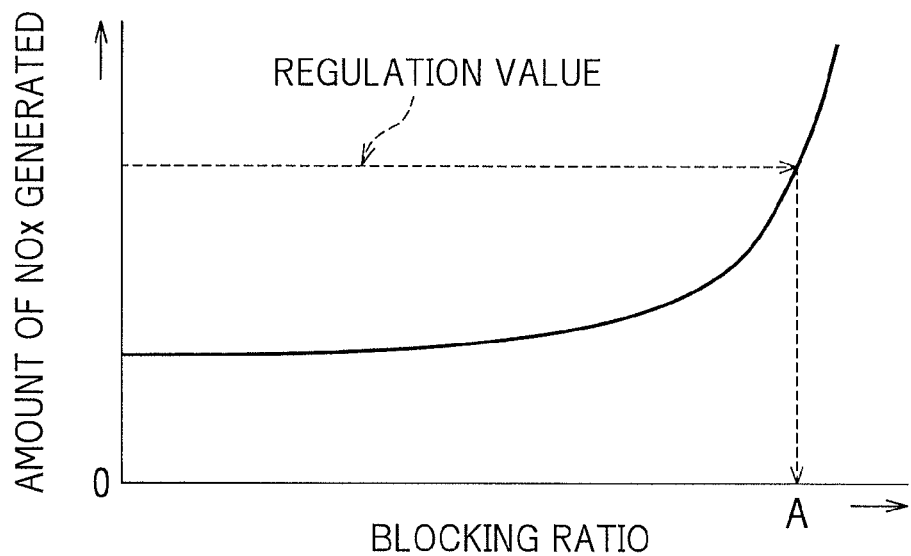
FIG. 7 is a diagram illustrating a relation between a blocking ratio and an amount of NOx generated in a case where blocking occurs in the LPL-EGR mechanism according to an embodiment of the present invention.

FIG. 7 is a diagram illustrating a relation between a blocking ratio in the case where the blocking occurs in the LPL-EGR mechanism 7 (ratio for which the path area is narrow in the case where the blocking occurs in any portion of the LPL-EGR mechanism 7 (area to be blocked/path area in the case where no blocking occurs)) and an amount of NOx generated (amount of NOx generated per travel distance unit of the vehicle) according to an embodiment of the present invention.

As a blocking ratio with respect to the amount of NOx generated corresponding to a regulation value (so-called OBD regulation value; deterioration allowance limit for exhaust emission) shown in FIG. 7, a blocking ratio A in the diagram (for example, 90%) is obtained. That is, in order to determine a state where the amount of NOx generated reaches the regulation value, it is necessary to determine with high accuracy that a blocking ratio reaches A in the diagram.

Figure 8:
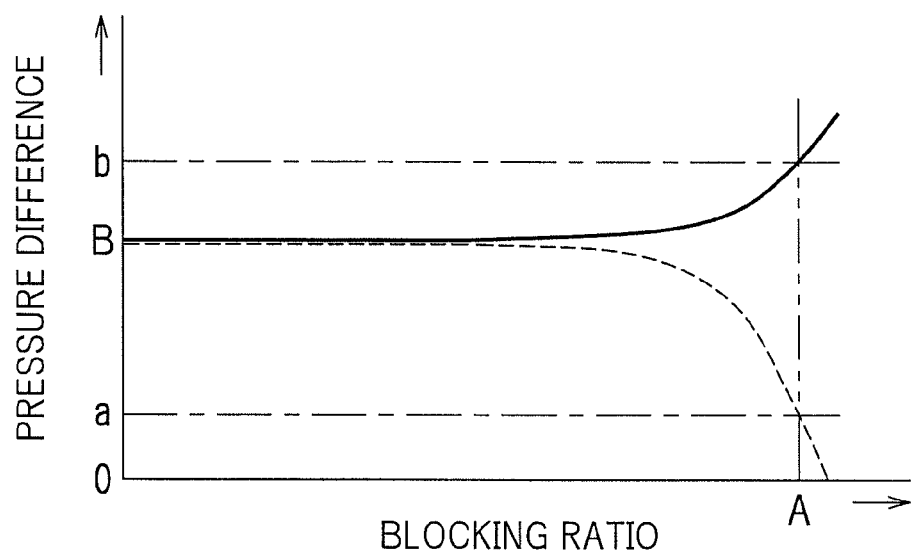
FIG. 8 is a diagram illustrating a relation between the blocking ratio and a pressure difference in a case where the blocking occurs in an inside of a low pressure EGR cooler and in a case where the blocking occurs in an inside of a pipe according to an embodiment of the present invention.

Also, FIG. 8 is a diagram illustrating a relation between the blocking ratio and the pressure difference in the case where the blocking occurs in the inside of the low pressure EGR cooler 73 and the case where the blocking occurs in the inside of the upstream side pipe 74 or the downstream side pipe 75 according to an embodiment of the present invention. That is, FIG. 8 shows a relation between the pressure difference and the blocking ratio A with respect to the amount of NOx generated corresponding to the regulation value.

A pressure difference value B in FIG. 8 is a reference pressure difference value in the case where the blocking ratio is "0" (no blocking). That is, the pressure difference value B is a pressure difference value corresponding to the original pressure loss due to internal resistance in the pipes 74 and 75, and the low pressure EGR cooler 73. In other words, when a detected pressure difference value is "B", it is assumed that the LPL-EGR mechanism 7 is in a state where no blocking occurs (no sediment) or a state where the blocking slightly occurs (a few sediments).

Then, when the blocking occurs in any portion of the LPL-EGR mechanism 7, the actual pressure difference value is deviated from the reference pressure difference value B in accordance with its blocking ratio.

As the direction of the deviation, when the blocking occurs in the inside of the low pressure EGR cooler 73, the actual pressure difference value increases along with the ascent of the blocking ratio (see a solid line in FIG. 8) so as to deviate on the positive side with respect to the reference pressure difference value B. This is because the pressure loss increases due to the blocking in the inside of the low pressure EGR cooler 73. That is, whereas the pressure on the exhaust path 5 side (the upstream side pipe 74 side) increases due to the blocking in the inside of the low pressure EGR cooler 73, the intake negative pressure works on the intake path 3 side (the downstream side pipe 75 side), which causes a pressure difference therebetween to be increased. Then, in this case where the blocking ratio reaches "A" in the diagram, that is, a blocking ratio corresponding to the amount of NOx generated applied as the regulation value, the pressure difference reaches "b" in the diagram. That is, when the pressure difference reaches "b" in the diagram, the blocking occurs in the inside of the low pressure EGR cooler 73, and it can be determined that its blocking ratio is "A" in the diagram, which is the blocking ratio with respect to the amount of NOx generated corresponding to the regulation value.

In contrast, when the blocking occurs in the inside of the upstream side pipe 74 or the downstream side pipe 75, the actual pressure difference value decreases along with the ascent of the blocking ratio (see a dashed line in FIG. 8) so as to deviate on the negative side with respect to the reference pressure difference value B. This is because when no blocking occurs, a relatively large amount of the EGR gas flows in the inside of the low pressure EGR cooler 73, and a pressure difference value corresponding to the original pressure loss in the inside of the low pressure EGR cooler 73 is obtained, but when the blocking occurs on the upstream side or the downstream side of the low pressure EGR cooler 73, the amount of the EGR gas flowing through the inside of the low pressure EGR cooler 73 is extremely reduced, which does not obtain a high pressure difference. Then, in this case where the blocking ratio reaches "A" in the diagram, that is, the blocking ratio with respect to the amount of NOx generated corresponding to the regulation value, the pressure difference reaches "a" in the diagram. That is, when the pressure difference reaches "a" in the diagram, the blocking occurs in the inside of the upstream side pipe 74 or the downstream side pipe 75, and it can be determined that its blocking ratio is "A" in the diagram, which is the blocking ratio with respect to the amount of NOx generated corresponding to the regulation value.

In the manner described above, the predetermined value a and the predetermined value b are set, and at the step ST4, it is determined whether the pressure difference value (actual pressure difference value) is within a range that is equal to or higher than the predetermined value a and that is equal to or lower than the predetermined value b (a≤actual pressure difference value≤b).

Then, when the pressure difference value is within the range that is equal to or higher than the predetermined value a and that is equal to or lower than the predetermined value b, and the determination is YES at the step ST4, the process goes to a step ST5, and the normality determination is carried out. That is, the normality determination is carried out because it is assumed that no blocking occurs in the LPL-EGR mechanism 7, or it is in a blocking state where the amount of NOx generated is restrained below the regulation value, and the process is returned.

In contrast, when the pressure difference value is out of the range that is equal to or higher than the predetermined value a and that is equal to or lower than the predetermined value b, and the determination is NO at the step ST4, the process goes to a step ST6 where a failure determination is carried out. That is, the failure determination is carried out because it is assumed that the blocking occurs in any portion of the LPL-EGR mechanism 7 (there occurs the blocking by which the amount of NOx generated reaches the regulation value).

Subsequently, the process goes to a step ST7, where it is determined whether the actual pressure difference value exceeds the predetermined value b.

Then, when the actual pressure difference value exceeds the predetermined value b, and the determination is YES at the step ST7, the process goes to a step ST8 where it is determined that the blocking occurs in the inside of the low pressure EGR cooler 73. Along with the failure determination, for example, failure information (information to the effect that the blocking occurs in the inside of the low pressure EGR cooler 73) is written into diagnosis provided in the ECU 10. Also, cautions are given to a driver as needed.

In contrast, when the actual pressure difference value does not exceed the predetermined value b, and the determination is NO at the step ST7, it is assumed that the actual pressure difference value is lower than the predetermined value a, and the process goes to a step ST9 where it is determined that the blocking occurs in the inside of the upstream side pipe 74 or the downstream side pipe 75. Along with the failure determination, for example, failure information (information to the effect that the blocking occurs in the inside of the upstream side pipe 74 or the downstream side pipe 75) is written into the diagnosis provided in the ECU 10. Also, cautions are given to a driver as needed.

The operations described above are carried out in a predetermined period (for example, 1 trip), and when the blocking occurs in the LPL-EGR mechanism 7, its blocking portion is identified.

In the manner described above, according to the present embodiments, it is possible to identify the blocking portion in the LPL-EGR mechanism 7 based on the pressure difference between the upstream side pressure and the downstream side pressure of the low pressure EGR cooler 73. Accordingly, when the blocking occurs in the inside of the low pressure EGR cooler 73, it is possible to determine with high accuracy that the blocking occurs. Also, it is possible to distinguish the blocking in the inside of the low pressure EGR cooler 73 from the blocking in the inside of the pipe 74 and the pipe 75 that are connected to the low pressure EGR cooler 73 with high accuracy. When a component in which the blocking occurs needs to be exchanged, a superfluous component exchange can be eliminated (a state where a piping component in which no blocking occurs is forced to be exchanged). Also, this failure diagnosis (diagnosis for blocking portions) can be executed when the LPL mode is applied or in the operating area on the relatively high load side in the MPL mode, and the chances of executing the failure diagnosis can be increased, and the failure diagnosis can be carried out early.

In the present embodiments, the pressure difference sensor 89 can be used as both a sensor to identify the blocking portion in the LPL-EGR mechanism 7 and a sensor to assume the recirculation amount of exhaust gas in the LPL-EGR mechanism 7.

Other Embodiment

The present embodiment above describes a case where the present invention is applied to the inline four-cylinder diesel engine mounted in an automobile. The present invention is not limited to the automobile but can be applied to engines that are used for various purposes. Also, the number of cylinder and types of engines (inline-type engines, V-type engines, horizontally opposed engines, and the like) are in particular not limited.

Also, in the present embodiments, there has been described the case where the present invention is applied to one wherein, when the blocking occurs in the LPL-EGR mechanism 7, its blocking portion is identified. The present invention is not limited to this, but can be applied to one wherein, when an EGR cooler is provided in the HPL-EGR mechanism 6, and the blocking occurs in the HPL-EGR mechanism 6, its blocking portion is identified.

Also, in the present embodiments, there has been described the case where the present invention is applied to the engine 1 including the two EGR mechanisms 6 and 7, but not limited to this. The present invention can be applied to an engine including one EGR mechanism or an engine including three EGR mechanisms or more. In this case, as described above, it is possible to identify the blocking portion in the EGR mechanism including the EGR cooler.

Also, in the present embodiments, the pressure introducing portion (connecting portion of the upstream side gas introducing pipe 89b) on the upstream side of the low pressure EGR cooler 73 is positioned nearer to the low pressure EGR cooler 73 than to the linking portion between the low pressure EGR cooler 73 and the upstream side pipe 74. The present invention is not limited to this, but the linking portion between the low pressure EGR cooler 73 and the upstream side pipe 74 (between the flanges 74b and 73c) may be applied. Similarly, a pressure introducing portion on the downstream side of the low pressure EGR cooler 73 (connecting portion of the downstream side gas introducing pipe 89c) may be applied, and a linking portion between the low pressure EGR cooler 73 and the downstream side pipe 75 (between the flanges 73d and 75a).

INDUSTRIAL APPLICABILITY

The present invention can be applied to blocking diagnosis of an MPL-EGR system mounted on a diesel engine.

DESCRIPTION OF THE REFERENCE NUMERAL

1 Engine (Internal combustion engine)
3 Intake path (Intake system)
4 Turbocharger (Supercharger)
42 Turbine
5 Exhaust path (Exhaust system)
6 HPL-EGR mechanism (High pressure EGR mechanism)
7 LPL-EGR mechanism (Low pressure EGR mechanism)
73 Low pressure EGR cooler
74 Upstream side pipe (Pipe member)
75 Downstream side pipe (Pipe member)
89 Pressure difference sensor
10 ECU

The invention claimed is:

1. A failure diagnosis apparatus of an EGR system comprising a pipe member and an EGR cooler linked to the pipe member and configured to recirculate part of exhaust gas discharged into an exhaust system of an internal combustion engine to an intake system via the pipe member and the EGR cooler, said failure diagnosis apparatus comprising:
an electronic control unit configured to:
receive a pressure difference between upstream side pressure and downstream side pressure of the EGR cooler from a pressure difference sensor;
compare a pressure difference value detected by the pressure difference sensor with a predetermined cooler blocking determination value and a predetermined pipe blocking determination value that is smaller than the cooler blocking determination value; and
determine that, when the pressure difference value detected is greater than the cooler blocking determination value, blocking occurs in an inside of the EGR cooler, and determine that, when the pressure difference value detected is smaller than the pipe blocking determination value, blocking occurs in an inside of the pipe member,
wherein a location of the blocking is written to the electronic control unit.

2. The failure diagnosis apparatus of the EGR system according to claim 1, wherein the cooler blocking determination value is set as a value corresponding to a blocking degree of the EGR cooler with respect to a deterioration allowance limit of exhaust emission specified in advance.

3. The failure diagnosis apparatus of the EGR system according to claim 1, wherein the pipe blocking determination value is set as a value corresponding to a blocking degree of the pipe member with respect to a deterioration allowance limit of the exhaust emission specified in advance.

4. The failure diagnosis apparatus of the EGR system according to claim 1,
wherein the pipe member comprises an upstream side pipe member linked to an upstream side of the EGR cooler and a downstream side pipe member linked to a downstream side of the EGR cooler,
wherein
the pressure difference sensor detects the pressure difference by taking as the upstream side pressure a pressure at a linking portion between the EGR cooler and the upstream side pipe member or at a position nearer to the EGR cooler than to the linking portion and taking as the downstream side pressure a pressure at a linking portion between the EGR cooler and the downstream side pipe member or at a position nearer to the EGR cooler than to the linking portion.

5. The failure diagnosis apparatus of the EGR system according to claim 1,
wherein the EGR system comprises a high pressure EGR mechanism configured to recirculate exhaust gas on an upstream side of a turbine of a supercharger in the exhaust system of the internal combustion engine to the intake system, and a low pressure EGR mechanism configured to recirculate exhaust gas on a downstream side of the turbine of the supercharger in the exhaust system to the intake system and include the EGR cooler, and
wherein the pressure difference sensor is configured to detect a pressure difference between the upstream side pressure and the downstream side pressure of the EGR cooler in the low pressure EGR mechanism, so as to determine a blocking portion in the low pressure EGR mechanism.

6. The failure diagnosis apparatus of the EGR system according to claim 1,
wherein the electronic control unit is further configured to assume a recirculation amount of the exhaust based on parameters including the pressure difference between the upstream side pressure and the downstream side pressure of the EGR cooler detected by the pressure difference sensor, an opening degree of an EGR valve that adjusts the recirculation amount of the exhaust gas, an exhaust gas temperature, and exhaust gas pressure.

* * * * *